United States Patent [19]

Prock

[11] Patent Number: 5,390,658
[45] Date of Patent: Feb. 21, 1995

[54] OPEN FIRE CAMP STOVE

[76] Inventor: Bobby J. Prock, 191 Crain St. SW., McDonald, Tenn. 37353

[21] Appl. No.: 212,048

[22] Filed: Mar. 14, 1994

[51] Int. Cl.$^6$ .................... A47J 37/00; F24B 3/00
[52] U.S. Cl. .................... 126/25 R; 126/9 R; 126/29
[58] Field of Search ............ 126/25 R, 25 A, 25 B, 126/29, 30, 9 R, 9 B, 40

[56] References Cited

U.S. PATENT DOCUMENTS

| 1,780,068 | 10/1930 | Dorman | 126/29 |
| 1,923,131 | 8/1933 | Wilkinson | 126/9 R |
| 4,023,474 | 5/1977 | Dixon | 126/9 R |

FOREIGN PATENT DOCUMENTS 136398  2/1950  Australia ................ 126/9 R

Primary Examiner—James C. Yeung
Attorney, Agent, or Firm—Hugh E. Smith

[57] ABSTRACT

A knock-down camp stove unit adapted to go over an open campfire and providing its own support for a cooking-baking compartment which comprises a first angled side panel; a second angled side panel; means removably connecting the upper ends of said side panels together; a cooking panel insertable between and supported by said side panels; and a pair of tapered end-closure panels removably engaging with said side panels and said cooking panel to form an enclosed compartment therewith.

5 Claims, 4 Drawing Sheets

OPEN FIRE CAMP STOVE

BACKGROUND OF THE INVENTION

1. Field of the Invention

The present invention relates to outdoor cooking units and more particularly pertains to such units which may be utilized with an open campfire.

2. Description of the Prior Art

The use of outdoor cooking units is known in the prior art. More specifically, units heretofore devised and utilized for the purpose of cooking over an open fire are known to consist basically of familiar, expected and obvious structural configurations, notwithstanding the myriad of designs encompassed by the crowded prior art which have been developed for the fulfillment of countless objectives and requirements. Generally these have entailed the use of some type of grill such as shown in U.S. Pat. Nos. 4,363,313; 3,837,328 and 4,829,977. Enclosed cooking units for over open fires are less usual and are typified by U.S. Pat. Nos. 3,667,446 and 4,651,708.

In this respect, the cooking unit according to the present invention substantially departs from the conventional concepts and designs of the prior art, and in so doing provides an apparatus primarily developed for the purpose of providing a variety of cooking options over an open fire with a unit easily collapsible for storage or transport.

Therefore, it can be appreciated that there exists a continuing need for new and improved cooking units which can be used over an open campfire. In this regard, the present invention substantially fulfills this need.

SUMMARY OF THE INVENTION

In view of the foregoing disadvantages inherent in the known types of open campfire cooking units now present in the prior art, the present invention provides an improved cook stove construction wherein the same can be utilized over open campfires. As such, the general purpose of the present invention, which will be described subsequently in greater detail, is to provide a new apparatus which has many of the advantages of the devices mentioned heretofore and many novel features that result in an open campfire cooking stove which is not anticipated, rendered obvious, suggested, or even implied by any of the prior art cooking units, either alone or in any combination thereof.

To attain this, the present invention generally relates to a knock-down camp stove unit adapted to go over an open campfire and providing its own support for a cooking-baking compartment which comprises a first angled side panel; a second angled side panel; means removably connecting the upper ends of said side panels together; a cooking panel insertable between and supported by said side panels; and a pair of tapered end-closure panels removably engaging with said side panels and said cooking panel to form an enclosed compartment therewith.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new open campfire cooking apparatus which has many of the advantages of the devices mentioned heretofore and many novel features that result in an open campfire cook stove which is not anticipated, rendered obvious, suggested, or even implied by any of the prior art cooking units, either alone or in any combination thereof.

It is another object of the present invention to provide a new and improved open campfire cooking stove which may be easily and efficiently manufactured and marketed.

It is a further object of the present invention to provide a new and improved open campfire cooking stove which is of a durable and reliable construction.

An even further object of the present invention is to provide a new and improved open campfire cooking stove which is susceptible of a low cost of manufacture with regard to both materials and labor, and which accordingly is then susceptible of low prices of sale to the consuming public, thereby making such cooking units economically available to the buying public.

Still yet another object of the present invention is to provide a new and improved open campfire cooking stove which provides in the apparatuses of the prior art some of the advantages thereof, while simultaneously overcoming some of the disadvantages normally associated therewith.

Still another object of the present invention is to provide a new and improved easily assembled and disassembled open campfire cooking stove.

Yet another object of the present invention is to provide a new and improved multi-function stove for use over an open campfire.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
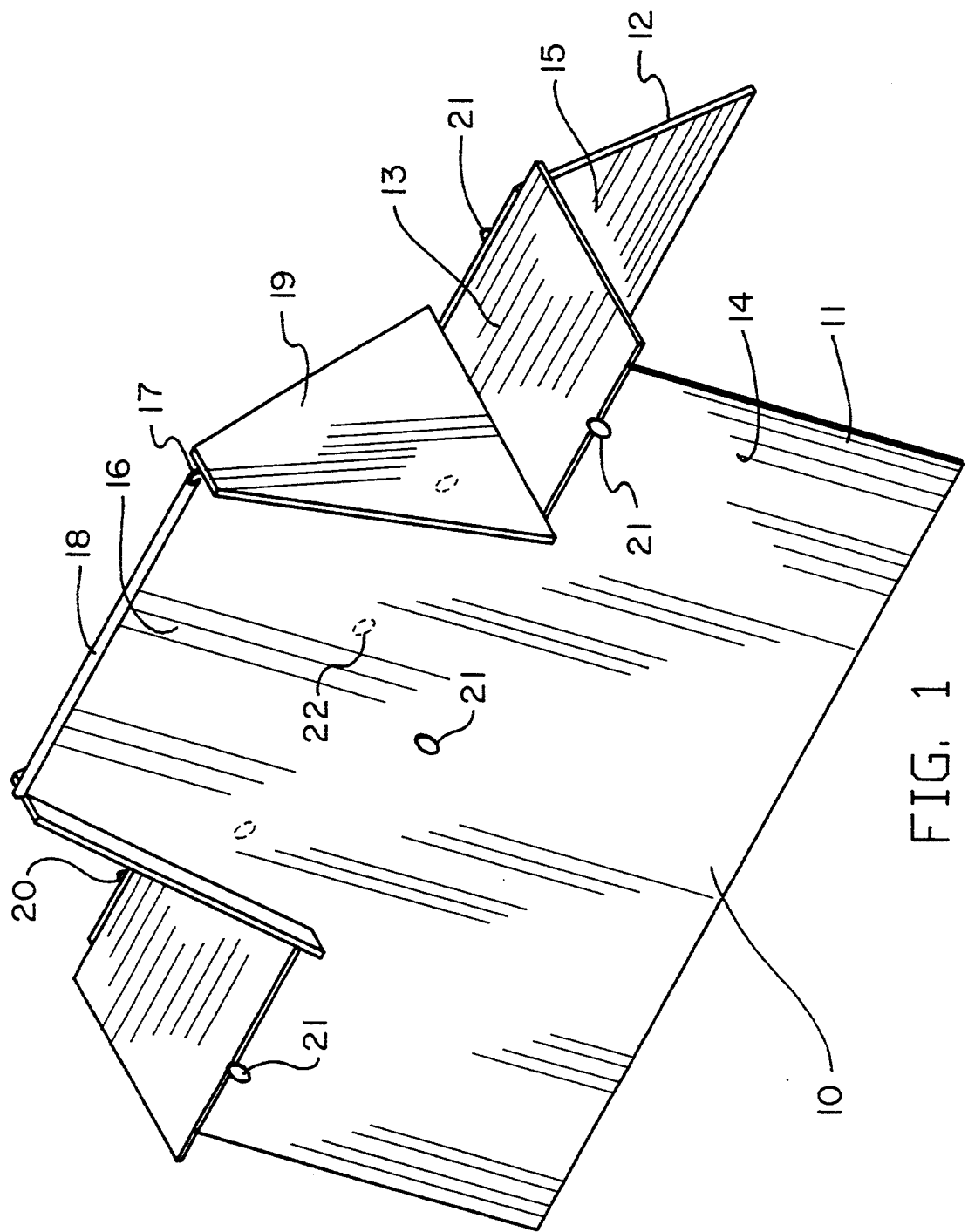
FIG. 1 is perspective view of the campfire cooking unit of the present invention.

With reference now to the drawings, and in particular to FIG. 1 thereof, a new and improved open campfire cooking stove embodying the principles and concepts of the present invention and generally designated by the reference numeral 10 will be described.

More specifically, it will be noted that the camp stove unit 10 is designed to sit on the ground over an open fire (not shown) with two inclined side panels 11 and 12 forming the ground-contacting supports for unit 10. Each side panel is formed of a single piece of steel and has the shape of a rectangle with a trapezoidal section extending upwardly in the middle portion thereof. A cooking surface is formed by cooking panel 13 supported over the fire on the lower sections 14 and 15 of the two side panels 11 and 12. The upper trapezoidal portions 16 and 17 of panels 11 and 12 removably engage at their upper ends with curved locking sections 18 holding the side panels 11 and 12 against lateral displacement. Removable door panels 19 and 20 are supported on cooking panel 13 and are in leaning engagement with upper portions 16 and 17 of side panels 11 and 12 to form therewith an enclosed compartment which serves as an oven for unit 10. Pins 21 extend through side panels 11 and 12 to provide additional support for cooking panel 13. Additional pins may be inserted in the upper portion 16 and 17 to support an oven rack or grill, if desired, as shown by dotted circles 22 on the drawing.

Figure 2:
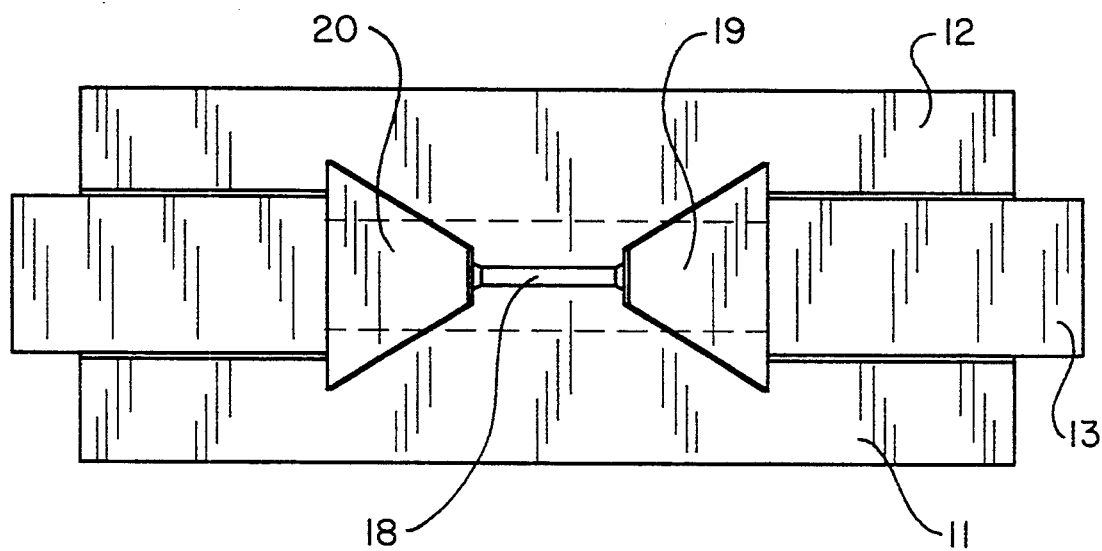
FIG. 2 is a top plan view of the unit of FIG. 1.
Figure 3:
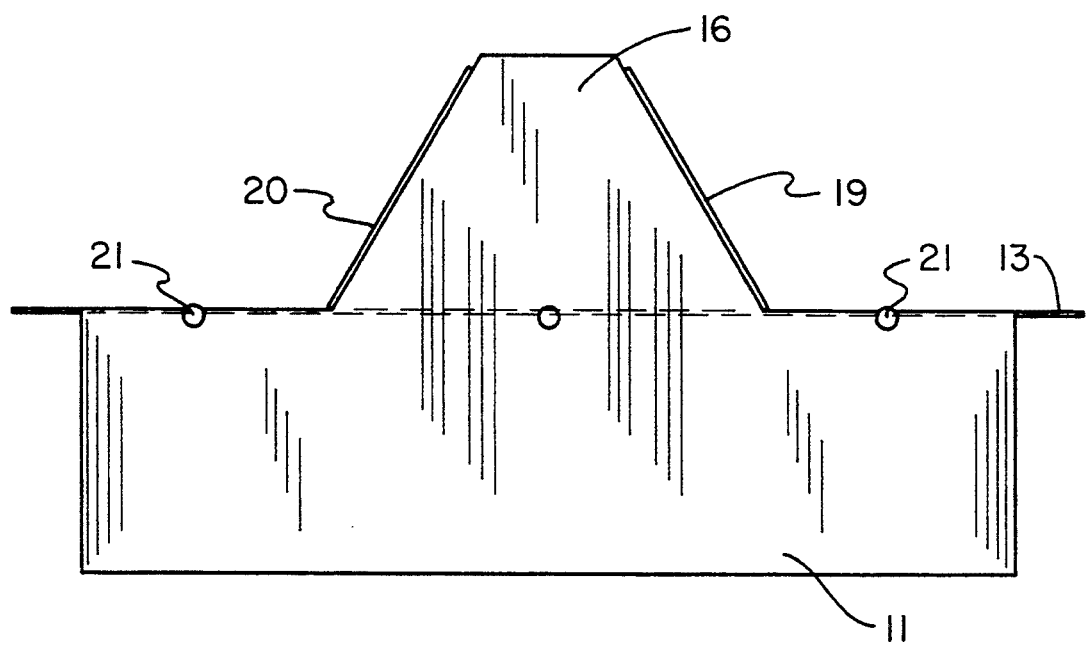
FIG. 3 is a side plan view of the unit of FIG. 1.

FIG. 2 is a top plan view showing the cooking panel 13, removable door panels 19 and 20, and the curved locking sections 18. A side view as shown in FIG. 3 shows the support pins 21 for supporting cooking panel 13 extending through side panel 11. The upper closed compartment formed by door panels 19 and 20 with the upper portions 16 of side panel 11 (and upper portion 17 of side panel 12, not visible in this view) and having as its base cooking panel 13 is easily visualized from this drawing.

Figure 4:
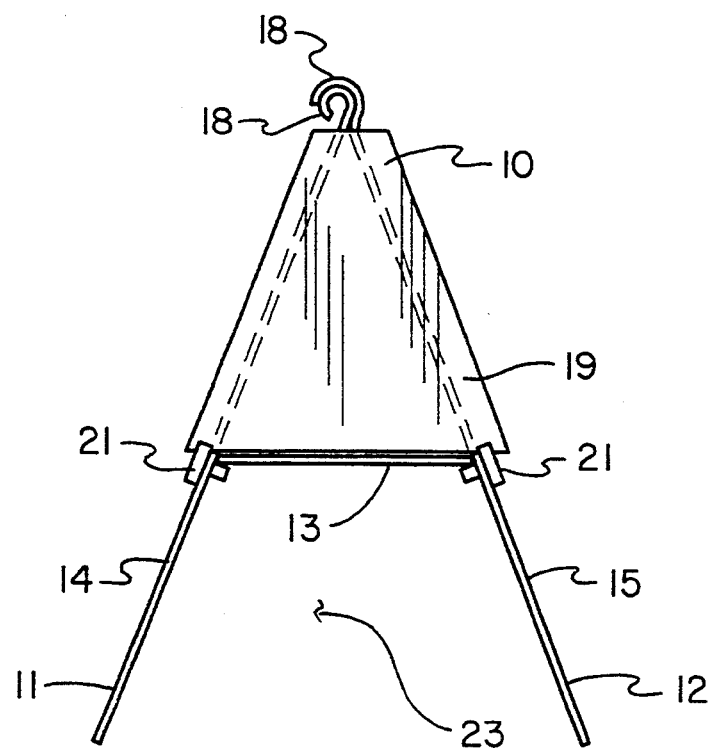
FIG. 4 is an end plan view of such element.

FIG. 4 illustrates the curved locking section 18 on side panels 11 and 12. The curved section 18 on one panel 12 is slightly larger than the corresponding curved section 18 on the second panel 11 to permit it to fit over the section 18 on such second panel 12. Also shown in this view is the fire zone 23 partially enclosed by the lower portions 14 and 15 of side panels 11 and 12. The lower portions 14 and 15 of these side panels 11 and 12, in addition to serving as the ground support members for stove unit 10, also serve as wind screens for the fire contained within fire zone 23. Pins 21 are also illustrated in this view.

Figure 5:
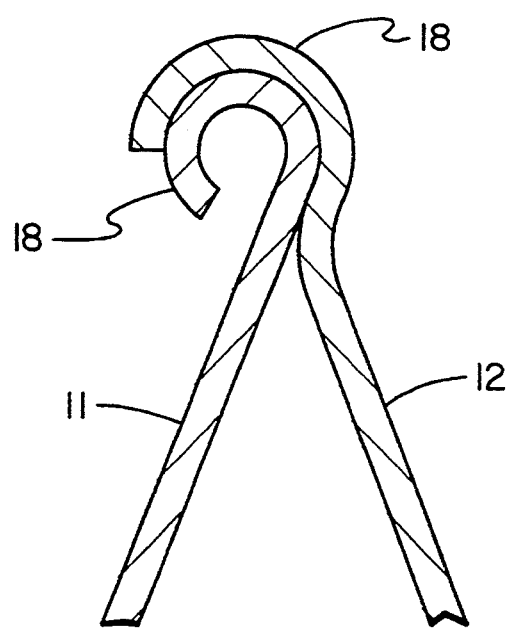
FIG. 5 is an enlarged sectional view of the means for connecting the side panels of the cooking unit to each other.

FIG. 5 is an enlarged section of the curved ends 18 on side panels 11 and 12 showing, as discussed in connection with FIG. 4, that the curved end 18 on side panel 12 is larger than that of side panel 11 to permit engagement thereover.

Figure 6:
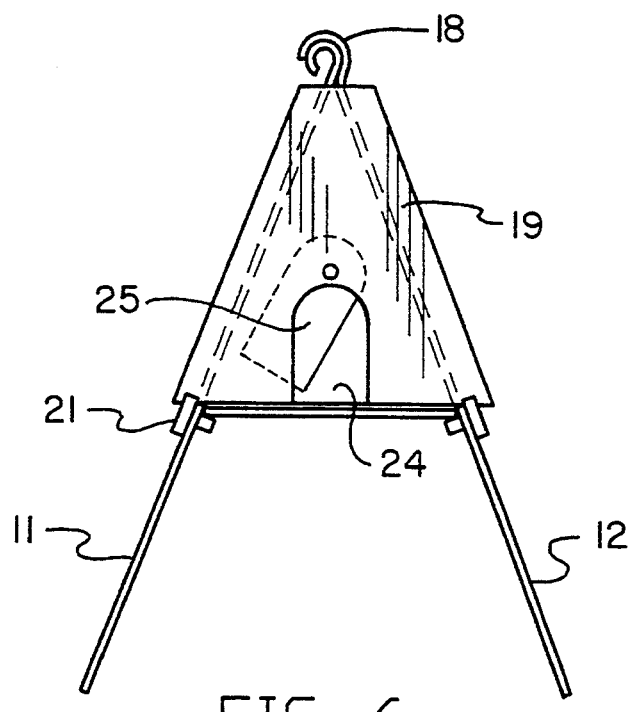
FIG. 6 is an end plan view of a modification of the unit of FIG. 1.

FIG. 6 illustrates a modification which may be added if desired. Here, an inspection port 24 is provided in removable door panel 19 with a pivoted closure plate 25 to permit viewing the state of food within the closed compartment referred to above without removal of such door panel 19.

Figure 7:
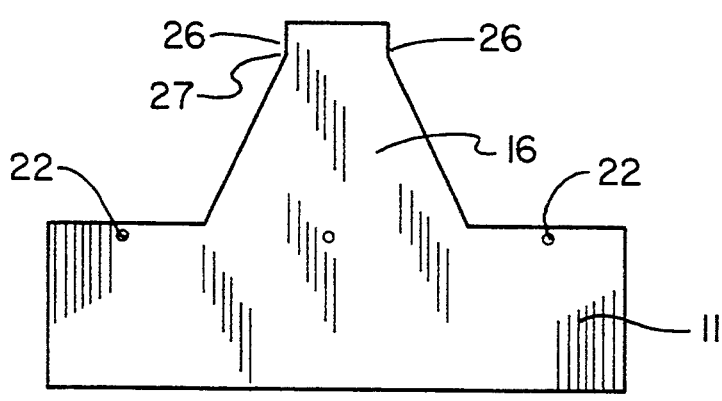
FIG. 7 is a plan view of a modified side panel for the unit of FIG. 1.

FIG. 7 shows a slight variation in the shape of the upper portions 16 and 17 of the side plates 11 and 12 to provide more positive engagement with door panels 19 and 20. This constitutes a vertical extension 26 on the upper portion 16 of side panel 11 (and the same on panel 12 not shown) extending up from the intersection joint 27 of such upper portion 16 with door panels 19 and 20.

Figure 8:
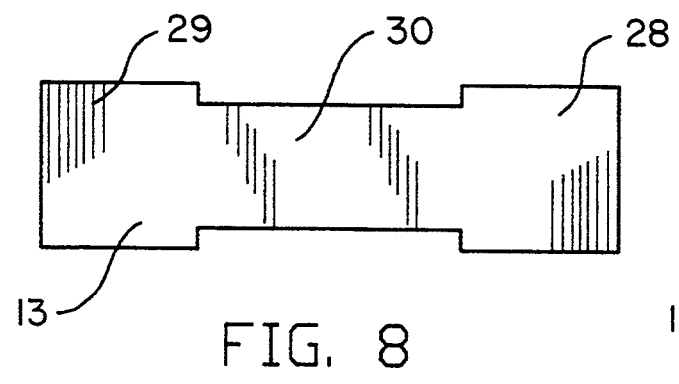
FIG. 8 is a plan view of the cooking panel of the invention.
Figure 9:
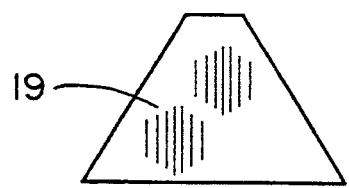
FIG. 9 is a plan view of one of the tapered end panels of the unit of the invention.

FIGS. 8 and 9 show the configuration of cooking panels 13 and door panel 19 respectively. It will be noted that cooking panel 13 has the outer ends 28 and 29 thereof wider than the central section 30 of such panel 13 to insure such panel 13 does not slip off the support provided by lower portions 14 and 15 of side panels 11 and 12. Ends 28 and 29 provide excellent frying surfaces for food being cooked over the fire positioned thereunder.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The camp stove unit consists of only five sections, i.e. two side panels, two door panels and one cooking panel, all made of steel plus the pins 21 (usually six in number although if a grill is to be used, an additional four to six pins may be used). This permits of easy storage of the unit in its knocked-down configuration and obviously the stove can be assembled or disassembled very quickly.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A open fire camp stove comprising a first angled side panel having a first angled side panel upper end; a second angled side panel having a second angled side panel upper end; means removably connecting said side panels together at the upper ends thereof; a flat cooking panel inserted between said side panels and supported thereby; and a pair of removable tapered end-closure door panels removably engaging with said side panels and said cooking panel to form a closed compartment therewith, wherein said side panels having a rectangular lower portion and a central trapezoidal upper section.

2. A stove as in claim 1 wherein said closed compartment is formed of the trapezoidal upper portions of said side panels, said end-closure door panels and said cooking panel.

3. A stove as in claim 1 wherein said flat cooking panel includes outer ends projecting said central trapezoidal upper sections such that the outer ends of said flat cooking panel provide frying surfaces.

4. A stove as in claim 1 wherein the lower portions of said side panels define an open fire zone and provide wind screens for an open fire within such zone.

5. A stove as in claim 1 wherein the upper ends of said side panels are curved, one of said curved upper ends fitting over the other of said curved ends to provide a locking engagement between said side panels.

* * * * *